United States Patent
Gerlach et al.

(10) Patent No.: US 9,647,805 B2
(45) Date of Patent: May 9, 2017

(54) METHOD FOR BEAM COORDINATION, AND A BASE STATION AND A USER TERMINAL THEREFOR

(75) Inventors: Christian Gerlach, Ditzingen (DE); Volker Braun, Stuttgart (DE); Andreas Weber, Lehrensteinsfeld (DE); Bozo Cesar, Stuttgart (DE); Oliver Stanze, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 235 days.

(21) Appl. No.: 14/234,198

(22) PCT Filed: Jul. 6, 2012

(86) PCT No.: PCT/EP2012/063204
§ 371 (c)(1),
(2), (4) Date: Jan. 22, 2014

(87) PCT Pub. No.: WO2013/013954
PCT Pub. Date: Jan. 31, 2013

(65) Prior Publication Data
US 2014/0146782 A1   May 29, 2014

(30) Foreign Application Priority Data

Jul. 22, 2011 (EP) .................................. 11305954

(51) Int. Cl.
*H04L 5/00* (2006.01)
*H04W 72/04* (2009.01)
(Continued)

(52) U.S. Cl.
CPC ........... *H04L 5/0032* (2013.01); *H04B 7/024* (2013.01); *H04B 7/0408* (2013.01);
(Continued)

(58) Field of Classification Search
CPC ............... H04W 72/08; H04W 72/082; H04W 28/0231; H04W 28/0236; H04W 36/20
See application file for complete search history.

(56) References Cited

U.S. PATENT DOCUMENTS

2004/0081121 A1* 4/2004 Xu ....................... H04B 1/7097
  370/329
2004/0146093 A1* 7/2004 Olson .................. H04B 1/7105
  375/148

(Continued)

FOREIGN PATENT DOCUMENTS

CN   101911760 A   12/2010
CN   102123525 A   7/2011
(Continued)

OTHER PUBLICATIONS

International Search Report for PCT/EP2012/063204 dated Aug. 13, 2012.
(Continued)

*Primary Examiner* — Jenee Williams
(74) *Attorney, Agent, or Firm* — Fay Sharpe, LLP

(57) ABSTRACT

The invention concerns a method for beam coordination between a first base station (M1) and a second base station (P1), wherein interfering beams (B2-B4) transmitted from the first base station (M1) are determined based on measured reference signals, dependent on a ranking of interfering beams (B2-B4) which shall be restricted in use, a restriction of a use of radio resources in the first base station (M1) in at least one ranked interfering beam (B3) is performed, and user terminals (UE1, UE2) served by the second base station (P1) are scheduled on radio resources which are restricted in use in the first base station (M1) in said at least one ranked interfering beam (B3), a base station and a user terminal therefor.

9 Claims, 3 Drawing Sheets

(51) Int. Cl.
  *H04B 7/024*   (2017.01)
  *H04B 7/0408*  (2017.01)
  *H04B 7/06*    (2006.01)
  *H04W 92/20*   (2009.01)

(52) U.S. Cl.
  CPC ......... *H04B 7/0617* (2013.01); *H04B 7/0632* (2013.01); *H04L 5/0035* (2013.01); *H04W 72/042* (2013.01); *H04W 72/0426* (2013.01); *H04W 72/046* (2013.01); *H04W 92/20* (2013.01)

(56) References Cited

U.S. PATENT DOCUMENTS

| | | | | |
|---|---|---|---|---|
| 2008/0031172 | A1* | 2/2008 | Nanda | H04W 72/0426 370/310.1 |
| 2008/0181174 | A1* | 7/2008 | Cho | H04B 7/0857 370/329 |
| 2008/0227422 | A1* | 9/2008 | Hwang | H04B 7/0452 455/278.1 |
| 2008/0233967 | A1* | 9/2008 | Montojo | H04W 72/082 455/452.2 |
| 2009/0181708 | A1* | 7/2009 | Kim | H04B 7/024 455/501 |
| 2009/0197588 | A1* | 8/2009 | Khandekar | H04W 72/082 455/422.1 |
| 2009/0202014 | A1* | 8/2009 | Mujtaba | H04B 7/0417 375/267 |
| 2010/0002643 | A1* | 1/2010 | Han | H04B 7/0417 370/329 |
| 2010/0029262 | A1* | 2/2010 | Wang | H04J 11/004 455/423 |
| 2010/0106828 | A1* | 4/2010 | Palanki | H04L 1/0028 709/224 |
| 2010/0317363 | A1* | 12/2010 | Bai | H04W 72/0413 455/452.2 |
| 2010/0329113 | A1 | 12/2010 | Madan et al. | |
| 2011/0014924 | A1* | 1/2011 | Hwang | H04W 72/082 455/452.1 |
| 2011/0039547 | A1* | 2/2011 | van Rensburg | H04W 72/1252 455/423 |
| 2011/0143674 | A1* | 6/2011 | Lim | H04W 72/082 455/63.1 |
| 2011/0201369 | A1* | 8/2011 | Kim | H04W 8/00 455/507 |
| 2011/0255514 | A1* | 10/2011 | Olofsson | H04W 72/0426 370/331 |
| 2011/0292846 | A1* | 12/2011 | Hu | H04W 72/00 370/280 |
| 2012/0052895 | A1* | 3/2012 | Clerckx | H04W 72/0426 455/509 |
| 2012/0113843 | A1* | 5/2012 | Watfa | H04W 72/1289 370/252 |
| 2012/0202541 | A1* | 8/2012 | Koo | H04L 1/20 455/501 |
| 2012/0327800 | A1* | 12/2012 | Kim | H04W 72/082 370/252 |
| 2015/0098440 | A1* | 4/2015 | Yang | H04J 11/0056 370/330 |

FOREIGN PATENT DOCUMENTS

| | | |
|---|---|---|
| WO | WO 2009/064699 A1 | 5/2009 |
| WO | WO 2009/120478 A2 | 10/2009 |

OTHER PUBLICATIONS

Alcatel-Lucent, Alcatel-Lucent Shanghai Bell, "Interference Mitigation for Heterogeneous Networks," 3GPP TSG RAN WG1 Meeting #59bis, Valencia, Spain Jan. 18-22, 2010, R1-100439, Agenda Item: 8.2.1, Document for Discussion, 2 pages.

Alcatel-Lucent, Alcatel-Lucent Shanghai Bell, "Best Companion Reporting for Single-Cell MU-MIMO Pairing," 3GPP TSG RAN WG1 #59 Meeting, Jeju, Korea, Nov. 9-13, 2009, R1-094613, Agenda Item: 7.5.2.1 Extensions to Rel-8 CQI/PMI/RI feedback, Document for: Discussion, 6 pages.

\* cited by examiner

METHOD FOR BEAM COORDINATION, AND A BASE STATION AND A USER TERMINAL THEREFOR

FIELD OF THE INVENTION

The invention relates to a method for beam coordination between a base station and a further base station, and a base station and a user terminal adapted to perform said method.

BACKGROUND

In heterogeneous network (HetNet) scenarios using standards like e.g. Third Generation Partnership Project Long Term Evolution (3GPP LTE) standard, so-called Pico base stations with their Pico cells are placed under the coverage of a so-called Macro base station. A Pico base station typically covers a small area e.g. in buildings, train stations or aircrafts or outside due to its lower power, whereas a Macro base station covers a larger area than a Pico base station, as e.g. an outdoor area.

In the downlink the interference on user terminals served by a Pico base station is usually dominated by the Macro base station that covers the Pico cell.

SUMMARY

In order to enhance the downlink transmission to the user terminals served by the Pico base station, the dominating interference from the Macro base station must be reduced or even removed.

More generally, the interference in a smaller cell that is put under the coverage of a larger cell which is the source of said interference must be reduced or even removed. E.g., the smaller cell may also be a Micro cell which has a coverage area which is slightly larger than the coverage area of a Pico cell.

The object of the invention is thus to propose a method for beam coordination between the Pico base station and the Macro base station which leads to a reduced or even removed interference from the Macro base station.

In a scenario where Pico cells are placed inside a Macro cell's coverage, the combined cell's throughput and the quality of service for the user terminals shall be maximized. Furthermore, moderate cell range extension of Pico cells shall be enabled, thus increasing the throughput fairness in the system.

According to the prior art, in case that both cells use the same carrier, time-domain Inter-Cell Interference Coordination (ICIC) can be used based on so-called almost blank subframes (ABS), and in case that e.g. two carriers are used, frequency-domain Inter-Cell Interference Coordination (ICIC) can be used.

In said cases the time or frequency resources are no longer available altogether for the user terminals in the Macro cell, and the cell throughput of the Macro cell is reduced by that approach. This reduction is not necessary since time or frequency resources need only be limited for certain beam directions that have an effect on the user terminals served by the Pico cell. Thus, if the Macro base station antennas bring about a beam-like transmission, only certain beams might impact the Pico cell, and it would be sufficient to avoid only said beams at least partially. So the known approaches impose unduly restrictions which are not necessary.

According to an embodiment of the invention, certain beams from the Macro base station that hit the Pico cell the most should primarily be avoided in order to reduce the interference to the Pico cell's user terminals. So said beams might have a time restriction, and e.g. only 6 out of 10 subframes would be available in said beams. Simultaneously, the downlink transmission in the Macro cell should preferably not be reduced too much. So e.g. said restricted time resources are used in other beams inside the Macro cell to serve user terminals of the Macro cell.

Thus, instead of avoiding transmissions altogether in the Macro base station for certain times or frequencies, certain times or certain frequencies are only restricted for certain beams. Part of the invention is that measurements of user terminals are consolidated by the Pico base station or another entity to get a long term decision on dominating beam interference for all relevant user terminals in the Pico cell. The beam interference reported by the user terminals is averaged and/or weighted according to relevance to come to a consolidated view which beams or precoding weights are most relevant to producing interference to the Pico cell. This reduces communication needs, and avoids a subframe by subframe decision, which interfering beam from the Macro base station should be restricted in use. The decision on dominating beam interference is then communicated to the Macro base station or to a further device in the network, e.g. to a so-called serving gateway or a central control entity, and a restriction of use of said interfering beam in the Macro base station is either requested e.g. by the serving gateway, another central entity or the Pico base station, or directly performed by the Macro base station.

In the general case it is also taken here into consideration that a Macro base station might need to take care of multiple Pico cells in its coverage area, and so the restrictions in use of interfering beams should be coordinated to allow full power use in the Macro cell, e.g. by restricting different time resources in different beams for different Pico cells.

Further part of the invention is that after finding a decision in the network over restricted time or frequencies in certain beams of the Macro base station, this information is communicated to the Pico base station. The Pico base station then schedules interference impacted user terminals based on their measurements on resources to exploit the global interference avoidance.

In order to reduce communication needs and avoid a subframe by subframe decision which interfering beam from the Macro base station should be restricted in use, a preferred embodiment of the invention is based on a semi-static behavior, i.e. the decision which interfering beam from the Macro base station should be restricted in use is repeatedly taken and the decision is then valid on a time scale which is above the length of a subframe.

In comparison to subframe based reporting from user terminals and restriction or scheduling coordination, there is only low communication need. In comparison to frequency or time based Inter-Cell Interference Coordination (ICIC) less restrictions need to be imposed in the Macro cell, i.e. other non interfering beams can still be used with full time/frequency resources. Further, if larger Pico cell range extensions shall be allowed, the invention can be combined with the use of almost blank subframes (ABS) in the Macro base station, such that user terminals with otherwise too high physical downlink control channel (PDCCH) block error rate (BLER) are scheduled only during blanked subframes of the neighboring Macro cell, while user terminals with acceptable PDCCH BLER can profit from the invention. Thus, for higher Pico cell bias values, i.e. large Pico cell range extension, the system throughput can be further optimized by avoiding unnecessary high number of blanked Macro cell subframes.

The object is thus achieved by a method for beam coordination between a first base station, as e.g. a Macro base station, and a second base station, as e.g. a Pico base station, wherein
- reference signals transmitted from the first base station are measured within the area served by the second base station,
- at least one interfering beam transmitted from the first base station which is relevant for creating interference for the area served by the second base station is determined based on said measured reference signals,
- dependent on a ranking of said at least one interfering beam which is relevant for creating interference for the area served by the second base station, a restriction of a use of at least one radio resource in the first base station in at least one ranked interfering beam is performed,
- and at least one user terminal served by the second base station is scheduled on at least one radio resource which is restricted in use in the first base station in said at least one ranked interfering beam.

The object of the invention is furthermore achieved by a base station for performing beam coordination between the base station and a further base station, wherein the base station comprises at least one processing means which is adapted to
- determine a ranking of interfering beams transmitted from the further base station which are relevant for creating interference for an area served by the base station, said interfering beams being determined based on measurements of reference signals transmitted from the further base station,
- and schedule at least one user terminal served by the base station on at least one radio resource which is restricted in use in the further base station in at least one ranked interfering beam.

The object of the invention is furthermore achieved by a base station for performing beam coordination between the base station and a further base station, wherein the base station comprises at least one processing means which is adapted to restrict dependent on a ranking of interfering beams transmitted from the base station which are relevant for creating interference for the area served by the further base station, a use of at least one radio resource in the base station in at least one ranked interfering beam.

The object is furthermore achieved by a user terminal for performing beam coordination between a serving base station and a further base station, wherein the user terminal comprises at least one processing means which is adapted to
- measure reference signals transmitted from the further base station,
- determine at least one interfering beam transmitted from the further base station based on said measured reference signals,
- and report at least one out of the group of interfering beam index and information about an interference strength of at least one of said at least one interfering beam to the serving base station.

The invention is described in the following within the framework of 3GPP LTE, however as the invention is not restricted to 3GPP LTE, but can in principle be applied in other networks that apply beamforming, like e.g. in WiMAX networks (WiMAX=Worldwide Interoperability for Microwave Access), in the following, instead of the term eNodeB used in LTE, the more general term base station is used.

Further developments of the invention can be gathered from the dependent claims and the following description.

BRIEF DESCRIPTION OF THE FIGURES

In the following the invention will be explained further making reference to the attached drawings.

DESCRIPTION OF THE EMBODIMENTS

Figure 1:
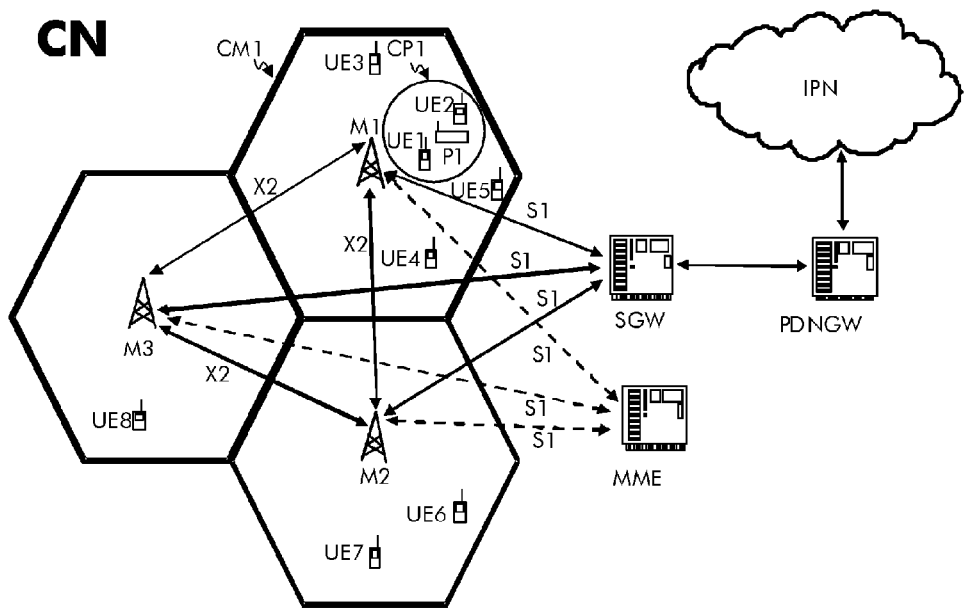
FIG. 1 schematically shows a communication network in which the invention can be implemented.

FIG. 1 shows as an example of a communication network in which the invention can be implemented a communication network CN according to the standard 3GPP LTE.

Said communication network CN comprises Macro base stations M1-M3, a Pico base station P1, user terminals UE1-UE8, a serving gateway SGW, a packet data network gateway PDNGW, and a mobility management entity MME.

The user terminals UE1 and UE2 are connected via radio connections to the Pico base station P1, and each of the user terminals UE3-UE8 is connected via radio connections to one of said Macro base stations M1-M3. In future evolutions of LTE, each of the user terminals UE3-UE8 could also be connected via radio connections to multiple of said Macro base stations M1-M3. The Macro base stations M1-M3 are in turn connected to the serving gateway SGW and to the mobility management entity MME, i.e. to the evolved packet core (EPC), via the so-called S1 interface. In the same way, the Pico base station P1 is connected to the serving gateway SGW and to the mobility management entity MME, which is not depicted in FIG. 1 for the sake of simplicity.

The Macro base stations M1-M3 and preferably also the Pico base station P1 are connected among each other via the so-called X2 interface.

The Pico base station P1 is connected to the Macro base station M1 either via fixed or a radio connection, which is not depicted in FIG. 1 for the sake of simplicity.

The serving gateway SGW is connected to the packet data network gateway PDNGW, which is in turn connected to an external IP network IPN.

The S1 interface is a standardized interface between one of the Macro base stations M1-M3 or the Pico base station P1, i.e. an eNodeB in this example, and the Evolved Packet Core (EPC). The S1 interface has two flavours, S1-MME for exchange of signalling messages between one of the Macro base stations M1-M3 and the mobility management entity MME and S1-U for the transport of user datagrams between one of the Macro base stations M1-M3 and the serving gateway SGW.

The X2 interface is added in 3GPP LTE standard primarily in order to transfer the user plane signal and the control plane signal during handover.

The serving gateway SGW performs routing of the IP user data between the Macro base stations M1-M3 and the Pico base station P1 respectively, and the packet data network gateway PDNGW. Furthermore, the serving gateway SGW serves as a mobile anchor point during handover either between different base stations, or between different 3GPP access networks.

The packet data network gateway PDNGW represents the interface to the external IP network IPN and terminates the so-called EPS bearer (EPS=Evolved Packet System) which is established between a user terminal UE1-UE8 and the respective serving Macro base station M1-M3 or Pico base station P1.

The mobility management entity MME performs tasks of the subscriber management and the session management, and also performs the mobility management during handover between different access networks.

The Pico base station P1 and the related coverage area of the Pico cell CP1 is placed under the coverage area of the Macro base station CM1. Thus, the downlink transmission from the Macro base station M1 is the dominating source of interference on the downlink transmission to the user terminals UE1 and UE2 served by the Pico base station P1.

According to an embodiment of the invention, by means of beam coordination between the Pico base station P1 and the Macro base station M1, the interference from the Macro base station can be reduced or even removed, which will be described below under FIG. 3.

Figure 2:
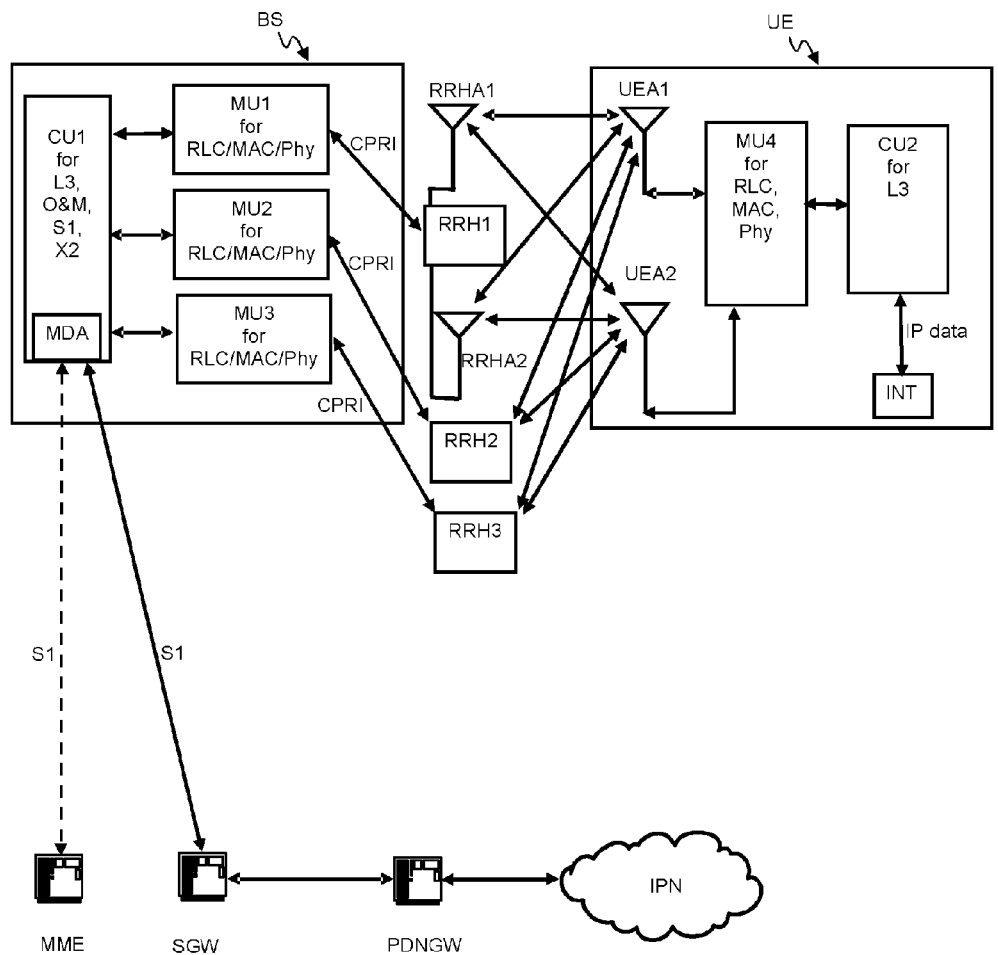
FIG. 2 schematically shows the structure of a user terminal and a base station in which the invention can be implemented.

FIG. 2 schematically shows the structure of a user terminal UE and a base station BS in which the invention can be implemented.

The base station BS comprises by way of example three modem unit boards MU1-MU3 and a control unit board CU1, which in turn comprises a media dependent adapter MDA.

The three modem unit boards MU1-MU3 are connected to the control unit board CU1, and to a respective remote radio head RRH1, RRH2, or RRH3 via a so-called Common Public Radio Interface (CPRI).

Each of the remote radio heads RRH1, RRH2, and RRH3 is connected by way of example to two remote radio head antennas RRHA1 and RRHA2 for transmission and reception of data via a radio interface. Said two remote radio head antennas RRHA1 and RRHA2 are only depicted for the remote radio head RRH1 in FIG. 2 for the sake of simplicity.

The media dependent adapter MDA is connected to the mobility management entity MME and to the serving gateway SGW and thus to the packet data network gateway PDNGW, which is in turn connected to the external IP network IPN.

The user terminal UE comprises by way of example two user terminal antennas UEA1 and UEA2, a modem unit board MU4, a control unit board CU2, and interfaces INT.

The two user terminal antennas UEA1 and UEA2 are connected to the modem unit board MU4. The modem unit board MU4 is connected to the control unit board CU2, which is in turn connected to interfaces INT.

The modem unit boards MU1-MU4 and the control unit boards CU1, CU2 may comprise by way of example Field Programmable Gate Arrays (FPGA), Digital Signal Processors (DSP), micro processors, switches and memories, like e.g. Double Data Rate Synchronous Dynamic Random Access Memories (DDR-SDRAM) in order to be enabled to perform the tasks described below.

The remote radio heads RRH1, RRH2, and RRH3 comprise the so-called radio equipment, e.g. modulators and amplifiers, like delta-sigma modulators (DSM) and switch mode amplifiers.

In downlink, IP data received from the external IP network IPN are transmitted from the packet data network gateway PDNGW via the serving gateway SGW to the media dependent adapter MDA of the base station BS on an EPS bearer. The media dependent adapter MDA allows for a connectivity to different media like e.g. fiber or electrical connection.

The control unit board CU1 performs tasks on layer 3, i.e. on the radio resource control (RRC) layer, such as measurements and cell reselection, handover and RRC security and integrity.

Furthermore, the control unit board CU1 performs tasks for Operation and Maintenance, and controls the S1 interfaces, the X2 interfaces, and the Common Public Radio Interface.

The control unit board CU1 sends the IP data received from the serving gateway SGW to a modem unit board MU1-MU3 for further processing.

The three modem unit boards MU1-MU3 perform data processing on layer 2, i.e. on the PDCP layer (PDCP=Packet Data Convergence Protocol) which is e.g. responsible for header compression and ciphering, on the RLC layer (RLC=Radio Link Control) which is e.g. responsible for segmentation and Automatic Repeat Request (ARQ), and on the MAC layer (MAC=Media Access Control) which is responsible for MAC multiplexing and Hybrid Automatic Repeat Request (HARQ).

Furthermore, the three modem unit boards MU1-MU3 perform data processing on the physical layer, i.e. coding, modulation, and antenna and resource-block mapping.

The coded and modulated data are mapped to antennas and resource blocks and are sent as transmission symbols from the modem unit board MU1-MU3 over the Common Public Radio Interface to the respective remote radio head RRH1, RRH2, or RRH3, and the respective remote radio head antenna RRHA1, RRHA2 for transmission over an air interface.

The Common Public Radio Interface (CPRI) allows the use of a distributed architecture where base stations BS, containing the so-called radio equipment control, are connected to remote radio heads RRH1, RRH2, and RRH3 preferably via lossless fibre links that carry the CPRI data. This architecture reduces costs for service providers because only the remote radio heads RRH1, RRH2, and RRH3 containing the so-called radio equipment, like e.g. amplifiers, need to be situated in environmentally challenging locations. The base stations BS can be centrally located in less challenging locations where footprint, climate, and availability of power are more easily managed.

The user terminal antennas UEA1, UEA2 receive the transmission symbols, and provide the received data to the modem unit board MU4.

The modem unit board MU4 performs data processing on the physical layer, i.e. antenna and resource-block demapping, demodulation and decoding.

Furthermore, the modem unit board MU4 performs data processing on layer 2, i.e. on the MAC layer (MAC=Media Access Control) which is responsible for Hybrid Automatic Repeat Request (HARQ) and for MAC demultiplexing, on the RLC layer (RLC=Radio Link Control) which is e.g. responsible for reassembly and Automatic Repeat Request (ARQ), and on the PDCP layer (PDCP=Packet Data Convergence Protocol) which is e.g. responsible for deciphering and header compression.

The processing on the modem unit board MU4 results in IP data which are sent to the control unit board CU2, which performs tasks on layer 3, i.e. on the radio resource control (RRC) layer, such as measurements and cell reselection, handover and RRC security and integrity.

The IP data are transmitted from the control unit board CU2 to respective interfaces INT for output and interaction with a user.

In the uplink, data transmission is performed in an analogue way in the reverse direction from the user terminal UE to the external IP network IPN.

In the sequel, the usage of beam coordination between the Pico base station P1 and the Macro base station M1 in order to reduce or even remove the interference from the Macro base station is described according to embodiments of the invention.

Figure 3:
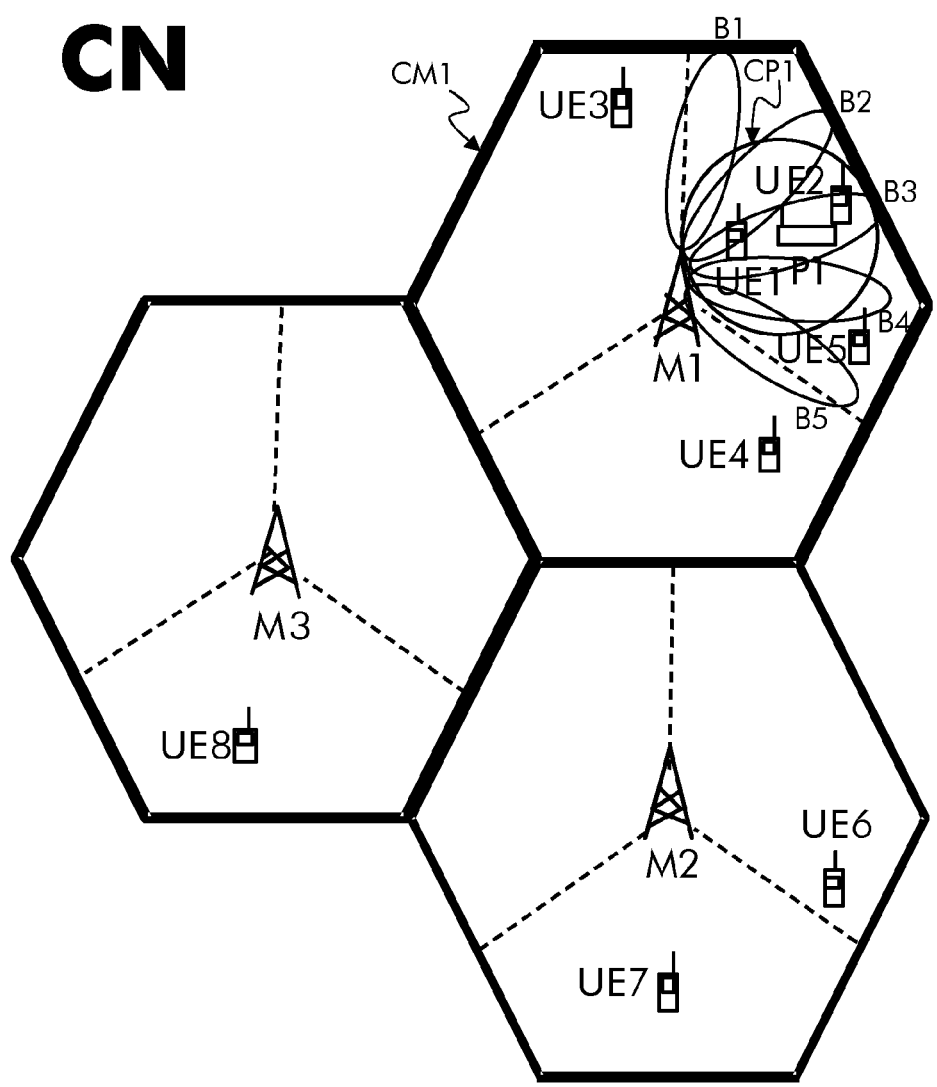
FIG. 3 schematically shows a communication network with Macro base stations and a Pico base station for beam coordination according to an embodiment of the invention.

FIG. 3 schematically shows a communication network with Macro base stations M1-M3, a Pico base station P1, and user terminals UE1-UE8 for beam coordination according to an embodiment of the invention.

Said communication network CN corresponds in principle to the communication network depicted in FIG. 1. However, for the sake of simplicity, a serving gateway, a packet data network gateway, and a mobility management entity as well as the S1 interfaces and the X2 interfaces are not depicted in FIG. 3.

As in FIG. 1, the user terminals UE1 and UE2 are connected via radio connections to the Pico base station P1, and each of the user terminals UE3-UE8 is connected via radio connections to one or multiple of said Macro base stations M1-M3.

Also similar to FIG. 1, the Pico base station P1 and the related coverage area of the Pico cell CP1 is placed under the coverage area of the Macro base station CM1. Thus, the downlink transmission from the Macro base station M1 is the dominating source of interference on the downlink transmission to the user terminals UE1 and UE2 served by the Pico base station P1.

The Macro base station M1 performs beamforming by means of applying e.g. MISO or MIMO transmission (MISO=multiple input single output; MIMO=multiple input multiple output) using at least two transmitting antennas, as e.g. the remote radio head antennas RRHA1 and RRHA2 in FIG. 2, and one (MISO) or more (MIMO) receiving antennas, as e.g. the user terminal antennas UEA1 and UEA2 in FIG. 2. Said beamforming results in downlink beams B1-B5 transmitted from the Macro base station M1. Separately encoded data signals can be transmitted via said downlink beams B1-B5 of the downlink channel on the same time/frequency—multiple access resource. In standards different than current LTE, data signals can be transmitted via said downlink beams B1-B5 of the downlink channel on the same time/frequency/code—multiple access resource.

For single user MIMO, e.g. in LTE Release 8 single stream codebook based precoding/beamforming is used and single user MIMO feedback information comprises three parameters: CQI (CQI=channel quality indication), PMI (PMI=precoding matrix indicator), and RI (RI=rank indication). CQI is a parameter indicating a channel quality of a downlink beam with a largest average received modulated carrier power. For LTE Release 8, the CQI parameter is an index for a transport format of the downlink channel. PMI is a parameter indicating a beam index, which corresponds to a precoding vector of the downlink beam for which the channel quality is reported in case PMI and CQI are reported together. The beam index belongs to an entry of a codebook, which contains precoding vectors with all allowed transmit antenna weight combinations. RI is a parameter estimated by the mobile station indicating a number of streams which can be sufficiently separated by the receiver of a user terminal.

FIG. 3 exemplarily shows five downlink beams B1-B5 which are built by allowed antenna weight combinations. Each downlink beam B1-B5 is directed towards a slightly different direction in space. Said downlink beams B1-B5 can be seen as interfering beams B1-B5 for user terminals UE1 and UE2 served by the Pico base station P1. In the example, the first user terminal UE1 is located within the coverage area of the interfering beams B2 and B3, and the second user terminal UE2 is located within the coverage area of the interfering beam B3.

In a so-called codebook shown in table 1, an allowed antenna weight combination is assigned to each beam B1-B5, which is equivalent to an allowed so-called precoding vector, with first complex Tx antenna weights (Tx=transmission) $w1\_i$ (i=1, 2, 3, 4, 5) as first weight parameters, e.g. for the first remote radio head antenna RRHA1, and with second complex Tx antenna weights $w2\_i$ (i=1, 2, 3, 4, 5) as second weight parameters, e.g. for the second remote radio head antenna RRHA2. Exemplarily, a first antenna weight parameter combination $w1\_1$, $w2\_1$ is used as a first precoding vector $wB1=(w1\_1, w2\_0)$ which corresponds to the first downlink beam B1. Similar mappings exist for the other downlink beams B2-B5.

The codebook is known by the Macro base station M1 and by all user terminals UE1, UE2 currently served by the Pico base station P1.

TABLE 1

| | Tx antenna weights | |
| --- | --- | --- |
| Beam | first weight parameters $w1\_i$ for the first remote radio head antenna RRHA1 | second weight parameters $w2\_i$ for the second remote radio head antenna RRHA12 |
| B1 | $w1\_1$ | $w2\_1$ |
| B2 | $w1\_2$ | $w2\_2$ |
| B3 | $w1\_3$ | $w2\_3$ |
| B4 | $w1\_4$ | $w2\_4$ |
| B5 | $w1\_5$ | $w2\_5$ |

The Macro base station M1 transmits reference signals e.g. via a first and a second antenna, as e.g. the remote radio head antennas RRHA1 and RRHA2 in FIG. 2. Candidates for such reference signals are e.g. so-called cell specific reference signals (CRS) as being used for example in an OFDM technique (OFDM=Orthogonal Frequency Division Multiplexing) for WiMAX systems (WiMAX=Worldwide Interoperability for Microwave Access) or release 8 or 9 3GPP LTE. Furthermore, such reference signals may also be channel state information reference signals (CSI RS) which have been introduced in release 10 3GPP LTE. The user terminals UE1, UE2 know parameters of a transmission vector $s=(s1,s2)$ of the reference signals.

The first user terminal UE1 receives the reference signals and determines a complex received value g1 of the sent out reference signals. In case of an OFDM radio communication system the complex received value g1 is to be determined for a certain sub-carrier. Reception powers $P\_g1\_s1$ and $P\_g1\_s2$ for the reference signals to be transmitted by the Macro base station M1 via the first antenna and the second antenna and measured by the first user terminal UE1 via a third antenna are equal to $|g1|^2(s1)$ and $|g1|^2(s2)$.

The first user terminal UE1 calculates a MISO channel vector H for a first downlink channel. The MISO channel vector H is time-dependent and frequency-dependent. In case of the two antennas transmitting at the Macro base station M1 and the third antenna receiving at the first user terminal UE1, a relation between the transmission vector s for the transmitted reference signals, the MISO channel vector H and the complex received value g1 is given by following equation:

$$g1 = \underline{H} * \underline{s} = (h11 \quad h12) * \begin{pmatrix} s1 \\ s2 \end{pmatrix}$$

Due to orthogonal transmission of the reference signals from the two antennas there are two equations for elements h11 and h12 of the MISO channel vector H:

$$g1 = h11 * s1$$

$$g1 = h12 * s2$$

The first user terminal UE1 can calculate the elements h11 and h12 of the MISO channel vector H based on the complex received value g1 determined beforehand and based on the transmission vector s.

In case of two reception antennas at the first user terminal UE1, a relation between the transmission vector s, a reception vector g and a MIMO channel matrix H' would be given by the following equation:

$$\underline{g} = \begin{pmatrix} g1 \\ g2 \end{pmatrix} = \underline{H}' * \underline{s} = \begin{pmatrix} h11 & h12 \\ h21 & h22 \end{pmatrix} * \begin{pmatrix} s1 \\ s2 \end{pmatrix}$$

Based on knowledge about the MISO channel vector H, the first user terminal UE1 calculates received carrier powers P_S_i for each allowed precoding vector. Such received carrier powers P_S_i can be for example average received modulated carrier powers. The first user terminal UE1 calculates complex elements h1_i' of equivalent channels, also known as effective channels, for each precoding vector wBIi (i=1, 2, 3, 4, 5) by multiplying the calculated MISO channel vector H with each precoding vector wBIi (i=1, 2, 3, 4, 5) of the table 1:

$$\underline{h1\_i'} = \underline{H} * \underline{wBIi} = (h11 \quad h12) * \begin{pmatrix} w1\_i \\ w2\_i \end{pmatrix},$$

$$(i = 1 \ldots N)$$

N is the number of the allowed precoding vectors and is equal to five according to the exemplary precoding vector selection of the table 1.

The first user terminal UE1 determines a received interfering power, i.e. interference strength, of at least one downlink beam by calculating squared absolute values of each complex element h1_i', and averaging the squared absolute values over a certain time and/or frequency for a certain amount of received reference signals.

Results of the calculation correspond to average received modulated carrier powers P_S_is $$P\_S\_i = |h1\_i'|^2, i = 1 \ldots N$$

Thus, the first user terminal UE1 can calculate based on the precoding codebook used in the Macro cell which precoding by the Macro base station M1 would create the largest interference impact for the first user terminal UE1.

According to FIG. 3, the third interfering beam B3 shall exemplarily be the downlink beam for the first user terminal UE1 with the highest interference strength, and the second interfering beam B2 shall exemplarily be the downlink beam for the first user terminal UE1 with the second highest interference strength.

In case of two reception antennas at the user terminal UE1, and N allowed precoding vectors wBIi, relations between vectors h_i''=(h1_i'', h2_i'') for the equivalent channels, the MIMO channel matrix H' and the precoding vectors wBIi would be given by following equations:

$$\underline{h_i''} \begin{pmatrix} h1\_i'' \\ h2\_i'' \end{pmatrix} = \underline{H} * \underline{wBIi} = \begin{pmatrix} h11 & h12 \\ h21 & h22 \end{pmatrix} * \begin{pmatrix} w1\_i \\ w2\_i \end{pmatrix},$$

$$i = 1 \ldots N$$

Also in this case e.g. by deriving squared absolute values of the respective effective channel vector and doing averaging over a certain time and/or frequency for a certain amount of received reference signals, an interference strength per each downlink beam can be determined.

Then the first user terminal UE1 transmits information about the precoding vector and the related interference strength of the interfering beam B3 with the highest interference strength, and of the interfering beam B2 with the second highest interference strength to the Pico base station P1.

According to various embodiments of the invention, information about the precoding vectors and the related interference strength of a predefined number of interfering beams with highest interference strength, information about the precoding vectors and the related interference strength of a number of interfering beams with an interference strength above a predefined threshold, or even information about the precoding vectors and the related interference strength of all interfering beams are transmitted from the first user terminal UE1 to the Pico base station P1.

Further user terminals served by the Pico base station P1, as e.g. user terminal UE2 in FIG. 3 perform a determination of the interference strength of interfering beams in an analogue way as described above, and also transmit information about at least one precoding vector, i.e. at least one beam, and the related interference strength to the Pico base station P1.

According to FIG. 3, the third interfering beam B3 shall exemplarily be also the downlink beam for the second user terminal UE2 with the highest interference strength.

In the embodiment depicted in FIG. 3, information about the precoding vectors and the related interference strength of interfering beams with an interference strength about a predefined threshold shall be transmitted. For the first user terminal UE1, the interfering beams B3 and B2, and for the second user terminal UE2, the interfering beam B3 shall have an interference strength above the predefined threshold and are thus reported to the Pico base station P1 together with the corresponding interference strength.

In a further embodiment of the invention, only information about the precoding vectors are transmitted from the user terminals to the Pico base station P1, and the related interference strength is not reported to the Pico base station P1. Thus, a ranking of the interfering beams is only performed based on an order and/or on an amount of reports of the reported interfering beams, and not based on the absolute value of the interference strength.

The reports from all served user terminals UE1, UE2 over a certain averaging time constitute a statistics for the Pico base station P1, which can perform a ranking of the interfering beams. If one precoding matrix indicator (PMI) is e.g. reported only seldom and with low impact, it can be ignored. Based on these reports over the averaging time the Pico base station P1 identifies the interfering beams or precoding matrices e.g. by statistical filtering which are the most relevant for creating interference for user terminals UE1, UE2 served by the Pico base station P1.

The relevance of the interfering beams of the Macro cell could be determined for example in relation to the frequency of occurrence, e.g. a first interfering beam is reported by 80% of all served user terminals as the dominant source of interference, whereas a second interfering beam is only reported by 50% of all served user terminals as the dominant source of interference, i.e. the sum of reports $$\sum_{UEs} R_i$$

of interfering beams $B_i$ from all user terminals served by the Pico base station P1 directly gives the ranking of the interfering beams, with $R_i$ being 1 if a user terminal reports the beam $B_i$ as dominant interfering beam, and with $R_i$ being 0 if a user terminal does not report the beam $B_i$ as dominant interfering beam. By comparing the results of the summations a final ranking can be achieved. In an alternative of the embodiment, not only reports of dominant interfering beams, but all reported beams with an interference strength above a predefined threshold are taken into account for the sum of reports $$\sum_{UEs} R_i.$$

The relevance of the interfering beams of the Macro cell could also be determined for example in relation to signal quality reported by the user terminals in the Pico cell, e.g. user terminals reporting wideband CQI (CQI=Channel Quality Indicator) in the Pico cell above say 15 dB are considered less important than user terminals reporting CQI between 0 dB and 15 dB etc.

In case the ranking of the interfering beams is based both on the frequency of occurrence of the interfering beams, and on the interference power, the ranking can e.g. be determined by means of a sum of the interference power $$\sum_{UEs} IP_i$$

of interfering beams $B_i$ of all user terminals, with $IP_i$ being the interference power of the interfering beams $B_i$.

In the embodiment depicted in FIG. 3, the Pico base station P1 performs a statistical evaluation of the interfering beams B2, B3 reported by the different user terminals UE1, UE2 served by the Pico base station P1. As the interfering beam B3 is reported both from the first user terminal UE1, and from the second user terminal UE2 as dominant interfering beam, the interfering beam B3 will be the one with the highest ranking followed by the interfering beam B2 reported only by the first user terminal UE1 as the interfering beam with the second highest interfering strength.

In an embodiment of the invention, not the user terminals UE1, UE2 served by the Pico base station P1 perform the measurement of reference signals and determination of interfering beams B2, B3 as described above, but the Pico base station P1 performs these tasks, in particular if the Pico base station P1 covers only a small geographic area, e.g. due to small transmit power. In this case, the Pico base station P1 is enabled to receive the downlink signals, i.e. reference signals, from the macro cell, which is also known as sniffing. This can be achieved by means of the Pico base station P1 temporarily stopping to transmit a downlink signal in order to receive on this carrier. This can be done e.g. periodically or during times of low traffic load or event-driven, e.g. triggered via signaling from Operations and Maintenance (O&M) or from the Macro cell. In an alternative of this embodiment, not the Pico base station P1, but a separate receiver connected to the Pico base station P1 performs the measurement of reference signals.

The Pico base station P1 then reports the ranking of the interfering beams to the Macro base station M1, which in turn restricts the use of radio resources, as e.g. time or frequency resources, e.g. at least in the interfering beam B3 with the highest ranking.

In an embodiment of the invention, the reports from all served user terminals UE1, UE2 and the resulting statistics are not evaluated in the Pico base station P1, but the reports are transferred to another entity which does the evaluation based on one or multiple Pico base station inputs.

Thus in a further embodiment of the invention, the Macro base station M1 requests information at least from the Pico base station P1 about influence of the at least one interfering beam B2-B4 transmitted from the first base station M1, as e.g. the ranking of the interfering beams, to foster a decision about beam usage restriction.

Since the interfering beams B2-B4 which are relevant for creating interference to the user terminals UE1, UE2 served by the Pico base station P1 do not change quickly and the results of an evaluation are relatively static, in an embodiment of the invention the restriction of use of radio resources in the interfering beams with the highest ranking is intended to be constant for longer time intervals.

Thus the restriction is changed e.g. only after a certain number of subframes but with the assumption that the decision is valid for a time period of several subframes, which may be e.g. defined. This is important since the maximum amount of communication over a base station backhaul interface might not allow for more exchange of information. So this makes restriction setting possible even if the base station communication is limited.

As a result of a decision process suitable restrictions are found. The Macro base station M1 informs at least the Pico base station P1 about the restrictions of the use of radio resources e.g. at least in the interfering beam B3 with the highest ranking, and the Pico base station P1 schedules one or more of its served user terminals UE1, UE2 on at least one of the radio resources that has been restricted in use from the Macro base station M1.

Alternatively, if the Pico base station P1 requests restrictions of the use of radio resources e.g. at least in the interfering beam B3 with the highest ranking, and if all requested restrictions are always fulfilled from the Macro base station M1, there is no need for the Macro base station M1 to inform the Pico base station P1 about said restrictions of the use of radio resources.

In an embodiment of the invention, the Pico base station P1 reports the ranking of the interfering beams to a central entity e.g. the serving gateway SGW, which in turn restricts the use of radio resources as described above.

In a further embodiment of the invention, the Pico base station P1 requests from the Macro base station M1 or the serving gateway SGW a restriction of the use of radio resources, as e.g. time or frequency resources, e.g. at least in the interfering beam B3 with the highest ranking. Such request is then granted or not.

In a yet further embodiment of the invention, due to the static locations of the Macro base station M1 and the Pico base station P1, and the small coverage area of the Pico cell, the most interfering beam or beams for a certain Pico cell might also be statically configured, i.e. restricted in use in the Macro cell, via Operations and Maintenance (O&M), especially in scenarios with low multipath propagation, e.g. rural scenarios. In this case calibrated antennas will ease such a pre-configuration.

The invention claimed is:

1. A method for beam coordination between a first base station and a second base station, wherein:
    reference signals transmitted from the first base station are measured by the second base station within the area served by the second base station,
    at least one interfering beam transmitted from the first base station which is relevant for creating interference for the area served by the second base station is determined by the second base station based on said measured reference signals,
    dependent on a ranking of said at least one interfering beam which is relevant for creating interference for the area served by the second base station, a restriction of a use of at least one radio resource in the first base station in at least one ranked interfering beam is performed,
    and at least one user terminal served by the second base station is scheduled on at least one radio resource which is restricted in use in the first base station (M1) in said at least one ranked interfering beam;
    wherein the second base station temporarily stops downlink transmission on at least one subcarrier in order to receive said reference signals on said at least one subcarrier.

2. A method according to claim 1, wherein said ranking is based on a statistical evaluation of information about an interference strength of said at least one interfering beam which is relevant for creating interference for the area served by the second base station.

3. A method according to claim 1, wherein said ranking of said at least one interfering beam which is relevant for creating interference for the area served by the second base station is determined based on at least one of a group of information about at least one channel quality determined by said at least one user terminal and a frequency of occurrence of interfering beams reported by said at least one user terminal.

4. A method according to claim 1, wherein the first base station communicates said restrictions of the use of said at least one radio resource in said at least one ranked interfering beam at least to the second base station.

5. A method according to claim 1, wherein the second base station requests said restriction of the use of said at least one radio resource in the first base station in said at least one ranked interfering beam.

6. A method according to claim 1, wherein the first base station requests information at least from the second base station about influence of the at least one interfering beam transmitted from the first base station to foster a decision about beam usage restriction.

7. A method according to claim 1,
    wherein said restriction of the use of said at least one radio resource in the first base station in said at least one ranked interfering beam is multiple times decided each decision being valid for a time scale which is above a length of a subframe,
    or wherein a restriction of a use of at least one radio resource in the first base station in at least one interfering beam is statically configured.

8. A method according to claim 1, wherein said at least one radio resource is at least one of a group of time resources and frequency resources.

9. A base station for performing beam coordination between the base station and a further base station, wherein the base station comprises:
    a receiver configured to receive one or more beams, which include interfering beams and non-interfering beams; and
    at least one processor coupled to the receiver, the processor being adapted to:
    measure said reference signals transmitted from the further base station;
    determine interfering beams transmitted from the further base station based on said measured reference signals;
    determine a ranking of interfering beams transmitted from the further base station which are relevant for creating interference for an area served by the base station, said interfering beams being determined based on measurements of reference signals transmitted from the further base station,
    and schedule at least one user terminal served by the base station on at least one radio resource which is restricted in use in the further base station in at least one ranked interfering beam;
    wherein the further base station temporarily stops downlink transmission on at least one subcarrier in order to receive said reference signals on said at least one subcarrier.

* * * * *